United States Patent [19]

Morden

[11] 3,757,605
[45] Sept. 11, 1973

[54] TORQUE RESPONSIVE TRANSMISSION MECHANISM

[75] Inventor: Russell L. Morden, Lansing, Mich.
[73] Assignee: General Motors Corporation, Detroit, Mich.
[22] Filed: Feb. 2, 1972
[21] Appl. No.: 222,888

[52] U.S. Cl. .................................... 74/751, 74/337
[51] Int. Cl. .......................... F16h 3/74, F16h 5/52
[58] Field of Search ..................................... 74/751

[56] References Cited
UNITED STATES PATENTS

| | | | |
|---|---|---|---|
| 1,943,324 | 1/1934 | Kendler | 73/751 |
| 2,238,125 | 4/1941 | Murray | 74/751 |
| 3,039,133 | 6/1962 | Milton et al. | 192/16 UX |
| 3,071,984 | 1/1963 | Milenbouic | 74/751 |
| 3,262,532 | 7/1966 | Phelps | 192/16 X |

*Primary Examiner*—Arthur T. McKeon
*Attorney*—W. E. Finken, Saul Schwartz et al.

[57] ABSTRACT

A mechanism adapted to transfer torque from an input to an output shaft at either a unitary transmission ratio or a ratio exceeding unity wherein the transmission ratio is automatically changeable in response to the magnitude of the torque applied at the input shaft, the mechanism including automatic ratio changing means including a pawl supported on the output shaft for rotation therewith and for radial bodily movement relative thereto between a retracted position and an extended position directly coupling the input and output shafts, a cam on the input shaft adapted to cam the pawl from the extended to the retracted position under conditions of high torque input, an annular actuator disposed about the output shaft and adapted to be engaged and bodily shifted by the pawl transversely of the output shaft during movement of the latter from the extended to the retracted position, and a cam between the actuator and the output shaft adapted to impart to the actuator during transverse bodily motion an axial component of bodily motion operative to activate a planetary gear set disposed between the input and output shafts for increasing the torque transmission ratio therebetween.

3 Claims, 7 Drawing Figures

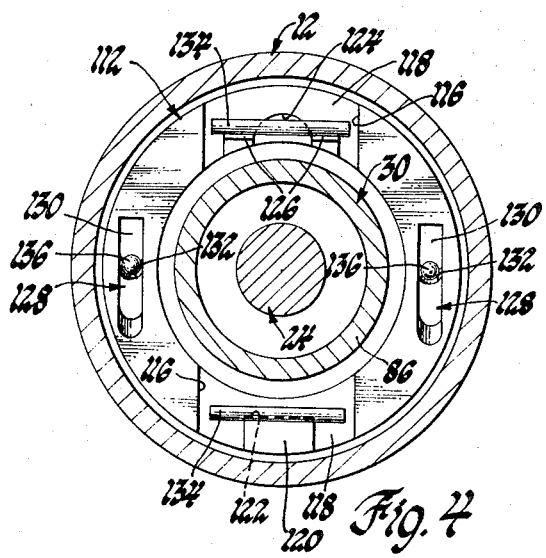
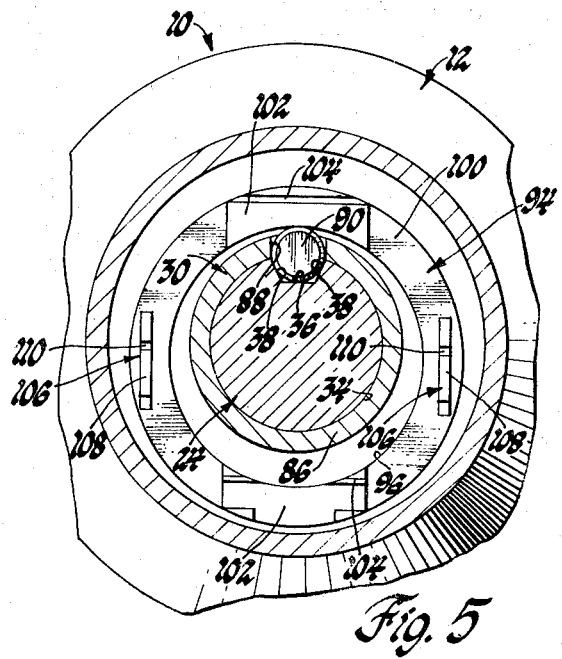
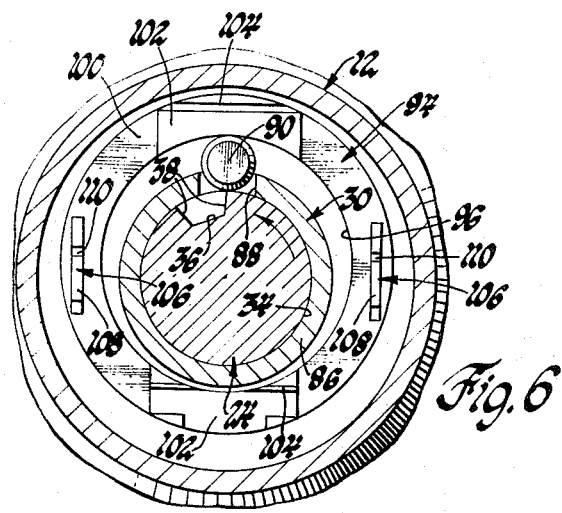
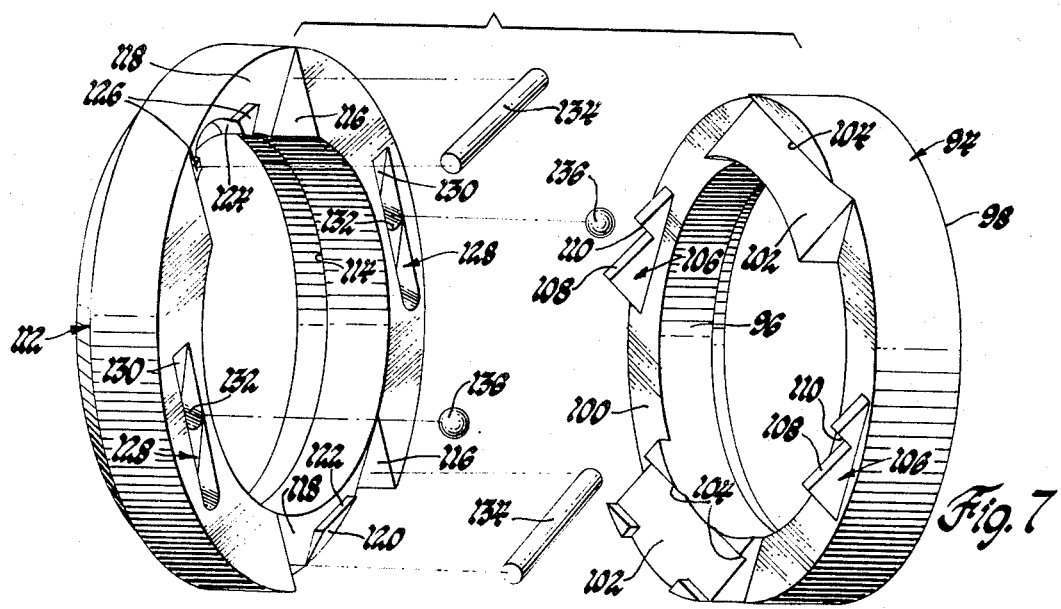

TORQUE RESPONSIVE TRANSMISSION MECHANISM

This invention relates generally to a mechanism for mechanically transferring torque from one rotating shaft to another and in particular to such a mechanism wherein the transmission ratio is automatically changeable.

In the copending applications of Morden et al. Ser. No. 131,267, now U.S. Pat. No. 3,704,637 filed Apr. 5, 1971 and Morden, Ser. No. 187,455 filed Oct. 7, 1971, both assigned to the assignee of this invention, there are disclosed torque responsive transmission mechanisms wherein the transmission ratio of each mechanism is automatically changeable in response to the magnitude of the torque input. Such mechanisms are, of course, particularly suited for incorporation into vehicle power steering systems featuring low steering gear ratios, the mechanisms functioning to increase the gear ratio of the steering system in the event of power failure. A torque responsive transmission mechanism according to this invention represents an improvement over the mechanisms disclosed in the aforementioned applications and over other known devices having similar performance characteristics.

The primary feature of this invention is that it provides an improved torque transmission mechanism particularly adapted for use in automotive steering systems which are characterized by low steering gear ratios. Another feature of this invention is that it provides an improved transmission mechanism wherein the torque transmission ratio between an input shaft and an output shaft automatically increases when the torque applied to the input shaft exceeds a predetermined minimum magnitude. Still another feature of this invention resides in the provision in the transmission mechanism of automatic ratio changing means including a pawl supported on the output shaft for rotation therewith and for radial bodily movement relative thereto between a retracted position and an extended position directly coupling the input and output shafts, first cam means on the input shaft adapted to cam the pawl from the extended to the retracted position under conditions of high torque input, an annular actuator disposed about the output shaft and adapted to be engaged and bodily shifted by the pawl transversely of the output shaft, and second cam means between the actuator and the output shaft adapted to impart to the actuator during transverse bodily motion an axial component of bodily motion, the axial motion component of the actuator being operative to activate a planetary gear set disposed between the input and output shafts for increasing the torque transmission ratio therebetween.

These and other features of this invention will be readily apparent from the following specification and from the drawings wherein:

FIG. 4 is a sectional view taken generally along the plane indicated by lines 4—4 in FIG. 2;

FIG. 5 is a sectional view taken generally along the plane indicated by lines 5—5 in FIG. 2 showing the pawl in the extended position thereof;

FIG. 6 is similar to FIG. 5 but showing the pawl in the retracted position thereof; and FIG. 7 is an exploded perspective view of a portion of the torque responsive clutch system.

Figure 1:
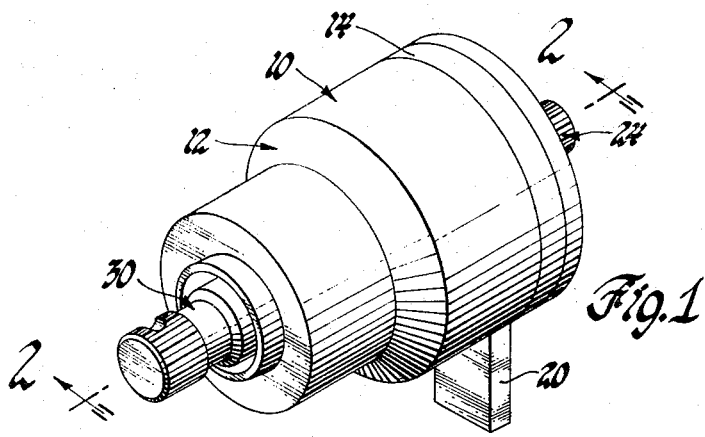
FIG. 1 is a perspective view of a transmission mechanism according to this invention.
Figure 2:
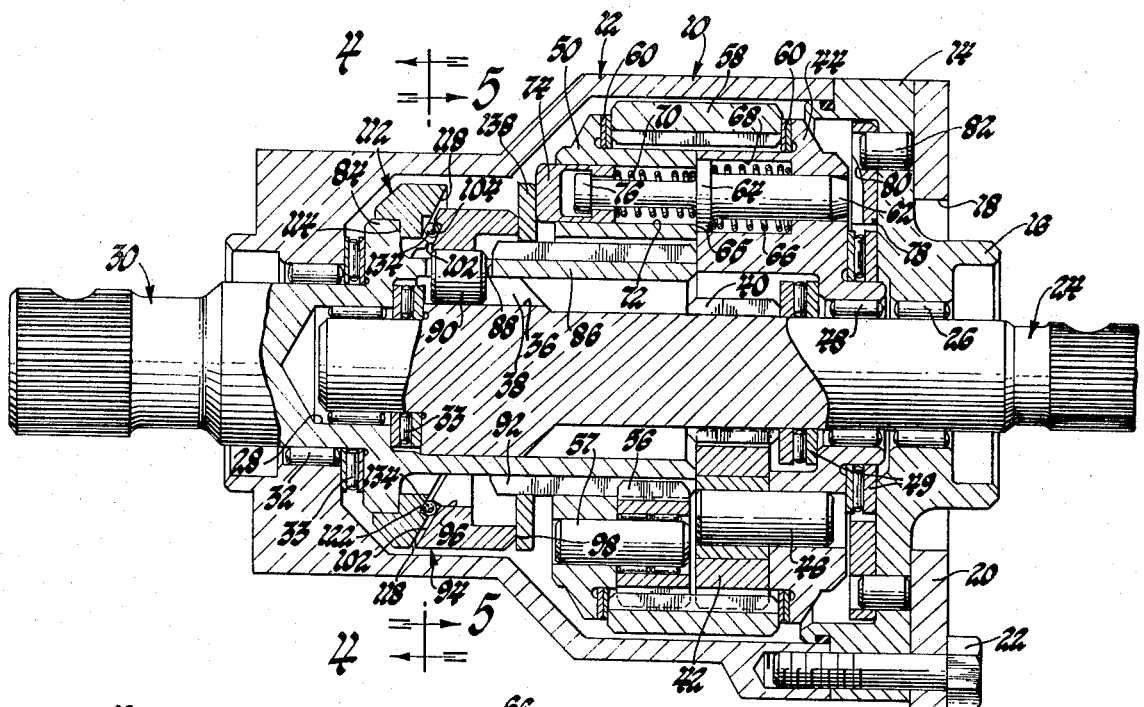
FIG. 2 is an enlarged sectional view taken generally along the plane indicated by lines 2—2 in FIG. 1 and showing the transmission mechanism in a unitary transmission ratio configuration.

Referring now to FIGS. 1 and 2 of the drawings, there shown is a torque transmission mechanism according to this invention designated generally 10 including a generally cylindrical housing 12 having one end closed by an end plate 14. A neck portion 16 of the end plate 14 projects through an aperture 18 in a support plate 20, the support plate being rigidly attached to the end plate by a plurality of bolts 22. The support plate 20 functions to maintain the housing 12 and end plate 14 stationary with respect to the structure on which the transmission mechanism is mounted and it will be understood that the support plate is merely a schematic representation of any appropriate support means as, for example, the conventional toe plate of an automobile vehicle body when the transmission mechanism 10 is incorporated into the steering system of the vehicle.

Figure 3:
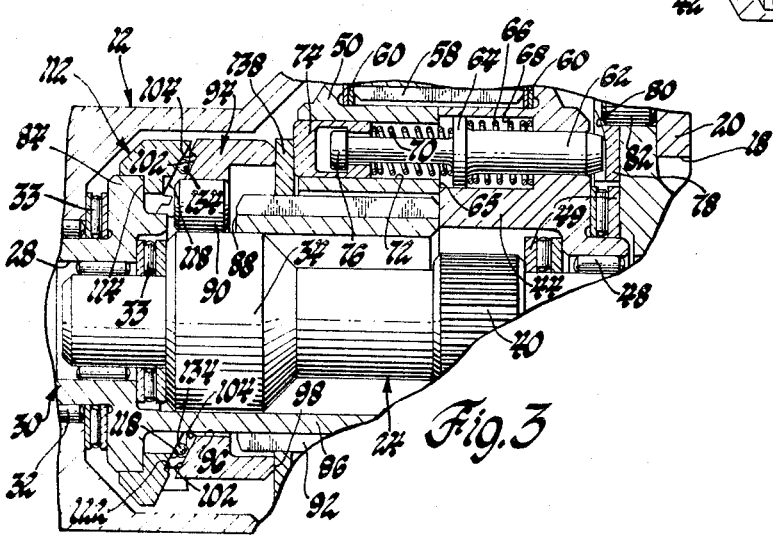
FIG. 3 is an enlarged view of a portion of FIG. 2 showing the torque responsive clutch system in the configuration thereof corresponding to a transmission ratio exceeding unity.

As seen best in FIGS. 2 and 3, an input shaft 24 is rotatably supported on the end plate 14 by a plurality of roller bearings 26 and is rotatably piloted in a bore 28 in an output shaft 30, the output shaft being rotatably supported in axial alignment with the input shaft on the housing 12 by a plurality of roller bearings 32. The input and output shafts are maintained axially stable by a plurality of thrust bearings 33. The input shaft 24 has formed thereon adjacent the end piloted in the output shaft 30 a cylindrical bearing surface 34 having therein an axially extending notch 36 including a pair of angularly disposed sides 38. Generally midway between the ends thereof the input shaft 24 has formed thereon a plurality of gear teeth defining an input sun gear 40.

The input sun gear 40 meshingly engages a set of three input planet gears, only gear 42 being shown in FIG. 2, each rotatably supported on a first planet carrier section 44 by a corresponding number of dowel pins 46, the first carrier section 44 being rotatably supported on the input shaft 24 by a plurality of roller bearings 48. A pair of thrust bearings 49 axially stabilize the first planet carrier section and cooperate with thrust bearings 33 in further axially stabilizing the input and output shafts.

Referring again to FIGS. 2 and 3, a second planet carrier section 50 is rigidly attached to the first planet carrier section 44 by a plurality of bolts, not shown, and rotatably supports on a trio of dowel pins a set of three output planet gears, only gear 56 on dowel 57 being shown in FIG. 2. Both the output and input planet gears meshingly engage and rotatably support within the housing 12 a ring gear 58. Concentricity between the ring gear 58 and the input shaft 24 is maintained by the planet gears while the axial position of the ring gear with respect to the rigidly connected first and second planet carrier sections is maintained by a pair of thrust bearings 60 disposed on opposite sides of the ring gear.

A trio of equi-angularly spaced lock pins are supported on the rigidly joined first and second planet carrier sections for rotation as a unit therewith and for axial bodily shiftable movement relative thereto, only one lock pin 62 being shown in FIGS. 2 and 3 and described hereinafter. Each lock pin has a rigid annular abutment ring 64 thereon which seats against a shoulder 65 on the second planet carrier section 50 to limit the leftward axial movement of the lock pin and against which seats one end of a coil spring 66, the other end of the spring being seated against the bottom of a counterbore 68 in the first planet carrier section 44 so that the lock pins are resiliently urged leftwardly, FIGS. 2 and 3. A second spring 70 disposed around the lock pin within a bore 72 in the second planet carrier section 50 seats at one end against the opposite side of annular abutment 64 and at the other end against a cap 74 supported on the lock pin for bodily shiftable movement relative thereto and retained thereon by a head portion 76 of the lock pin. The second spring 70 is somewhat stronger than the first spring 66 so that when the cap 74 is depressed the lock pin 62 is bodily shifted rightwardly with consequent compression of first spring 66.

A locking plate 78 having a plurality of notches 80 therein adapted to captively receive the right ends of the lock pins is rigidly attached to the end plate 14 by a plurality of dowel pins 82. When the caps 74 on the lock pins are depressed, each pin is forced rightwardly into the one of the notches 80 registering therewith thereby grounding the rigidly connected first and second planet carrier sections to the end plate 14 to prevent rotation of the carrier sections.

Referring again to FIGS. 2 and 3, the output shaft 30 includes an annular flange 84 and a hollow cylindrical end portion 86 extending perpendicularly to the flange. The end portion 86 closely and rotatably receives therewithin the cylindrical bearing surface 34 of the input shaft. As seen best in FIGS. 2, 3, 5 and 6, the end portion 86 has formed therein a generally square aperture 88 which is adapted to register with the notch 36 in the bearing surface 34 on the input shaft. A pawl in the form of a cylindrical roller 90 is relatively closely disposed in the aperture 88 for rotation as a unit with the output shaft and for generally radial bodily movement relative thereto between an extended position, FIGS. 2 and 5, wherein the pawl is situated simultaneously in both the notch 36 and the aperture 88 and a retracted position, FIGS. 3 and 6, wherein the pawl is disposed in the aperture 88 remote from the notch 36. As seen best in FIGS. 2 and 5, when the pawl is in the extended position thereof it functions to directly couple the input and the output shafts for transmission of torque at a unitary transmission ratio. As seen best in FIGS. 3 and 6, when the pawl is in the retracted position thereof, the coupling between the input and output shafts is terminated and each is free to rotate relative to the other.

Referring now to FIG. 2, the end portion 86 of the output shaft outboard of aperture 88 has formed thereon a plurality of external gear teeth defining an output sun gear 92. The output sun gear meshingly engages each of the output planet gears so that when the pawl 90 is in the retracted position thereof and the lock pins 62 are captively engaged in notches 80 to ground the planet carrier sections, torque transmission is effected from the input shaft to the output shaft at a ratio exceeding unity through the input sun gear 40, the input planet gears 42, the ring gear 58, the output planet gears 56, and the output sun gear 92.

Referring now to FIGS. 2 through 7, improved torque responsive clutch means are incorporated into the transmission mechanism to effect automatic change of the torque transmission ratio from unity to the higher ratio whenever the torque input at the input shaft 24 exceeds a predetermined minimum magnitude. The clutch means includes, along with the sides 38 of the notch 36 which define first cam means, an annular actuator 94 having a cylindrical internal surface 96, a leading face 98, and a trailing face 100. The actuator is disposed around the end portion 86 of the output shaft and, since the diameter of the internal surface 96 substantially exceeds the outer diameter of end portion 86, is adapted for bodily shiftable motion transversely of output shaft in a plane generally perpendicular to the axis thereof between a first position, FIGS. 2 and 5, corresponding to the extended position of the pawl 90, and a second position, FIGS. 3 and 6, corresponding to the retracted position of the pawl.

As seen best in FIGS. 2, 3, 5 and 7, the actuator 94 has formed thereon a diametrically opposed pair of raised first surface elements 102 disposed in parallel planes extending obliquely with respect to the longitudinal axis of the actuator and, of course, with respect to the axis of the output shaft. Each of the surface elements 102 has a raised step 104 formed generally at the top thereof as viewed in FIG. 7. The actuator 94 has further formed thereon a diametrically opposed pair of raised projections 106 each angularly spaced from respective ones of the first surface elements 102 by approximately 90°. Each of the projections 106 terminates in a top surface 108 disposed in a plane parallel to the planes of the first surface elements and has a step 110 formed thereon.

Referring now to FIGS. 2, 3, 4 and 7, the torque responsive clutch means further includes an annular cam member 112 having an internal shoulder 114 adapted to seat against flange 84 on the output shaft. The cam member further includes a pair of diametrically opposed grooves 116 the bottom surfaces of which define a pair of second surface elements 118 disposed in parallel planes extending obliquely with respect to the axis of the output shaft at an angle equal to the angle between the planes of the first surface elements and the output shaft axis. As seen in FIG. 7, the lower of the second surface elements 118 has a raised abutment 120 defining a shoulder 122 while the upper of the second surface elements has a notch 124 therein flanked on opposite sides by a pair of raised steps 126.

Angularly spaced approximately 90° from each of the second surface elements, the cam member has formed therein a pair of grooves 128 which define a corresponding pair of bottom surfaces 130 disposed in a plane parallel to the planes of the second surface elements. Each bottom surface 130 is interrupted by a respective one of a pair of steps 132 formed in the cam member. Accordingly, when the actuator and cam member are mounted on the output shaft, the first surface elements 102 register with and are generally parallel to the second surface elements 118 while the raised projections 106 are received in grooves 128 with the top surfaces 108 parallel to the bottom surfaces 130. Similarly, the pawl 90 registers with the notch 124 in the cam member and is adapted to move in the notch radially of the output shaft, the pawl thus connecting the cam member to the output shaft for unitary rotation.

As seen best in FIGS. 1, 4 and 7, a pair of cylindrical anti-friction rollers 134 are disposed between respective ones of the first and second surface elements while a pair of anti-friction balls 136 are disposed between respective ones of the top and bottom surfaces 108 and 130. The rollers 134 facilitate relative motion between the first and the second surface elements so that as the actuator undergoes transverse bodily shfitable movement from the first to the second position thereof the second surface elements impart to the actuator through the rollers a longitudinal or axial component of bodily motion thereby to move the actuator rightwardly from the position thereof shown in FIG. 1 to the position thereof shown in FIG. 2. Concurrently, the balls 136 between the top and bottom surfaces balance the actuator while rolling between the surfaces so that the actuator always remains substantially parallel to the cam member and in a plane perpendicular to the axis of the output shaft.

As seen best in FIGS. 2 and 7, the rollers 134 are retained in position by the shoulder 122 and step 126 on the cam member and the steps 104 on the actuator, the shoulder and the steps cooperating with the first and the second surface elements in defining an enclosure for the rollers. Similarly, the balls 136 are held in predetermined positions between the cam and the actuator by the steps 110 and 132 which cooperate with the top and bottom surfaces 108 and 130 in defining enclosures for the balls.

As seen best in FIGS. 2 and 3, an annular thrust bearing 138 is disposed around the teeth of the output sun gear 92 between the caps on the lOck pins and the leading face 98 of the actuator. The springs 66 and 70 cooperate in urging the bearing 138 leftwardly, FIGS. 2 and 3, thereby to effect a resilient bias on the actuator 94 toward the first position thereof, FIG. 2, and, consequently, on the pawl 90 toward the extended position thereof. Conversely, forced movement of the pawl from the extended to the retracted position effects concurrent axial and transverse bodily movement of the actuator and rightward bodily movement of the bearing 138 which thereby urges the lock pins toward the locked positions thereof to effect grounding of the planet carrier sections.

In a typical automotive application wherein the transmission mechanism 10 is incorporated into the vehicle power steering system with the input shaft 24 connected to the vehicle steering wheel and the output shaft 30 connected to the vehicle steering gear, it is desired that the torque transmission ratio between the input and output shafts normally be unity to take advantage of the low steering gear ratio which requires relatively few turns of the steering wheel to effect movement of the steerable road wheels from one extreme position to the other. Accordingly, the first and second springs 66 and 70 are calibrated to impart to the actuator 94 an axial load sufficient to maintain the pawl 90 under a predetermined resilient preload in the extended position thereof, FIGS. 2 and 5, directly coupling the input and the output shafts. Concurrently, of course, the lock pins 62 are withdrawn by the springs to within the first and second planet carrier sections so that the sections are freely rotatable within the housing 12. Therefore, when torque is applied to the input shaft, the output shaft rotates as a unit therewith as does the entire planetary gear train.

When a power failure occurs in the vehicle terminating the power assist to the steering gear, the torque input to the latter required to effect steering maneuvers increases. Accordingly, the operator exerts increased torque on the steering wheel to control the direction of the vehicle, which torque is applied to the input shaft 24. When the magnitude of the applied torque exceeds a predetermined minimum magnitude dependent upon the compressibility of the springs 66 and the angle of inclination of the sides 38 of notch 36, one of the sides 38 of the notch 36 cams the pawl 90 from the extended to the retracted position thereof against the opposing force generated thereon by the spring through the bearing 138 and the actuator 94. As the pawl 90 moves from the extended to the retracted position thereof, FIGS. 3 and 6, the actuator undergoes simultaneous transverse and axial bodilY motion, the axial component of motion effecting depression of the caps 74 through the bearing 138.

If, at the instant the caps are depressed, the lock pins 62 are in register with corresponding ones of the notches 80 in the locking plate 78, the lock pins project into the notches to ground the connected first and second planet carrier sections and thereby establish torque transmission from the input shaft to the output shaft through the planetary gear set at a higher transmission ratio. If, at the instant the caps 74 are depressed, the lock pins 62 are not in register with the notches 80 on the lock plate, the lock pins are held out of the notches by the lock plate with the second springs 70 compressed until registry is achieved whereupon the springs 70 project the lock pins into the notches to effect grounding of the first and second planet carrier sections.

Having thus described the invention, what is claimed is:

1. In a torque transmission mechanism normally effecting torque transfer between a rotating input shaft and a rotating output shaft at a unitary transmission ratio and automatically shiftable to a higher transmission ratio in response to torque input exceeding a predetermined minimum magnitude, said mechanism including a stationary housing and a normally inactive planetary gear set disposed therein between said input and said output shafts and said planetary gear set including one element rigidly connectable to one of said housing and said input shaft to effect torque transmission through said planetary set, a torque responsive clutch system comprising, means on said input shaft defining a pawl receiving notch, pawl means disposed on said output shaft for unitary rotation therewith and for generally radial bodily movement relative thereto between an extended position engaging said receiving notch to directly couple said input and said output shafts for unitary ratio torque transfer and a retracted position remote from said receiving notch permitting relative angular movement between said input and said output shafts, spring means urging said pawl means toward the extended position thereof, cam means on said input shaft responsive to application of torque to said input shaft of magnitude exceeding a predetermined minimum magnitude to shift said pawl means against said spring means from the extended to the retracted position thereof, an annular actuator disposed about said output shaft for transverse bodily movement in a plane generally perpendicular to the axis of said output shaft between a first position corresponding to the extended position of said pawl means and a second position corresponding to the retracted position of said pawl means, said pawl means being engageable on said actuator and operative upon movement from the extended to the retracted position to effect concurrent movement of said actuator from the first to the second position, cam means on said output shaft engageable on said actuator and responsive to transverse bodily movement of the latter from the first to the second position thereof for imparting to said actuator an axial component of bodily motion parallel to the axis of said output shaft, lock means disposed on said one rigidly connectable planetary gear set element and movable between an unlocked position and a locked position rigidly connecting said one element to said one of said housing and said input shaft, and means connecting said actuator to said lock means responsive to the axial motion component of said actuator for moving said lock means from the unlocked to the locked position thereof.

2. In a torque transmission mechanism normally effecting torque transfer between a rotating input shaft and a rotating output shaft at a unitary transmission ratio and automatically shiftable to a higher transmission ratio in response to torque input exceeding a predetermined minimum magnitude, said mechanism including a stationary housing and a normally inactive planetary gear set disposed therein between said input and said output shafts and said planetary gear set including one element rigidly connectable to one of said housing and said input shaft to effect torque transmission through said planetary set, a torque responsive clutch system comprising, means on said input shaft defining a pawl receiving notch, pawl means disposed on said output shaft for unitary rotation therewith and for generally radial bodily movement relative thereto between an extended position engaging said receiving notch to directly couple said input and said output shafts for unitary ratio torque transfer and a retracted position remote from said receiving notch permitting relative angular movement between said input and said output shafts, spring means urging said pawl means toward the extended position thereof, cam means on said input shaft responsive to application of torque to said input shaft of magnitude exceeding a predetermined minimum magnitude to shift said pawl means against said spring means from the extended to the retracted position thereof, an annular actuator disposed about said output shaft for transverse bodily movement in a plane generally perpendicular to the axis of said output shaft between a first position corresponding to the extended position of said pawl means and a second position corresponding to the retracted position of said pawl means, said pawl means being engageable on said actuator and operative upon movement from the extended to the retracted position to effect concurrent movement of said actuator from the first to the second position, cam means on said actuator defining a flat surface disposed obliquely with respect to the axis of said output shaft, a cam member on said output shaft having thereon a surface registering with and extending parallel to said oblique surface, anti-friction means disposed between said parallel surfaces adapted to facilitate relative movement therebetween so that said parallel surfaces cooperate in imparting to said actuator an axial component of bodily motion in response to transverse bodily motion of the latter from the first to the second position thereof, lock means disposed on said one rigidly connectable planetary gear set element and movable between an unlocked position and a locked position rigidly connecting said one element to said one of said housing and said input shaft, and means connecting said actuator to said lock means responsive to the axial motion component of said actuator for moving said lock means from the unlocked to the locked position thereof.

3. In a torque transmission mechanism normally effecting torque transfer between a rotating input shaft and a rotating output shaft at a unitary transmission ratio and automatically shiftable to a higher transmission ratio in response to torque input exceeding a predetermined minimum magnitude, said mechanism including a stationary housing and a normally inactive planetary gear set disposed therein between said input and said output shafts and said planetary gear set including one element rigidly connectable to one of said housing and said input shaft to effect torque transmission through said planetary set, a torque responsive clutch system comprising, means defining on said input shaft a pawl receiving notch, pawl means disposed on said output shaft for unitary rotation therewith and for generally radial bodily movement relative thereto between an extended position engaging said receiving notch to directly couple said input and said output shafts for unitary ratio torque transfer and a retracted position remote from said receiving notch permitting relative angular movement between said input and said output shafts, spring means urging said pawl means toward the extended position thereof, cam means on said input shaft responsive to application of torque to said input shaft of magnitude exceeding a predetermined minimum magnitude to shift said pawl means against said spring means from the extended to the retracted position thereof, an annular actuator disposed about said output shaft for transverse bodily movement in a plane generally perpendicular to the axis of said output shaft between a first position corresponding to the extended position of said pawl means and a second position corresponding to the retracted position of said pawl means, said pawl means being engageable on said actuator and operative upon movement from the extended to the retracted position to effect concurrent movement of said actuator from the first to the second position, means on said actuator defining a pair of diametrically opposed parallel first surface elements each extending in a plane disposed obliquely with respect to the axis of said output shaft, an annular cam member on said output shaft having a diametrically opposed pair of second surface elements disposed in planes parallel to the plane of said first surface elements and registering with respective ones of said first surface elements on said actuator, a pair of anti-friction rollers disposed between respective ones of the registered first and second surface elements to facilitate relative movement therebetween, said second surface elements being operative through said rollers to impart an axial component of bodily motion to said actuator in response to transverse bodily motion of the latter from the first to the second position thereof, means on said actuator defining a diametrically opposed pair of raised projections each having a top surface disposed in a plane parallel to the planes of said first surface elements, each of said raised projections being angularly spaced from a corresponding one of said first surface elements by approximately 90°, means on said cam member defining a diametrically opposed pair of grooves each having a bottom surface disposed in a plane parallel to the planes of said second surface elements and each angularly spaced from a corresponding one of said second surface elements by approximately 90°, a pair of anti-friction rolling elements disposed between respective ones of said bottom surfaces and said top surfaces for facilitating relative movement therebetween and for maintaining said actuator in a predetermined attitude during the combination transverse and axial bodily movement, lock means disposed on said one rigidly connectable planetary gear set element and movable between an unlocked position and a locked position rigidly connecting said one element to said one of said housing and said input shaft, and means connecting said actuator to said lock means responsive to the axial motion component of said actuator for moving said lock means from the unlocked to the locked position thereof.

* * * * *